# United States Patent [19]

McConnell

[11] 4,232,295
[45] Nov. 4, 1980

[54] JUKEBOX POLLING SYSTEM

[75] Inventor: George B. McConnell, Vienna, Va.

[73] Assignee: Data Information Systems Corporation, Alexandria, Va.

[21] Appl. No.: 30,055

[22] Filed: Apr. 13, 1979

[51] Int. Cl.² .............................................. H04Q 9/14
[52] U.S. Cl. ................................. 340/152 R; 340/162; 340/151
[58] Field of Search ..................... 340/152 R, 151, 162

[56] References Cited
U.S. PATENT DOCUMENTS
3,964,025  6/1976  Oosterhouse ........................ 340/162

Primary Examiner—Harold I. Pitts

[57] ABSTRACT

A data acquisition and transmission system for surveying a plurality of remotely location jukeboxes via telephone lines. A data collector, operatively associated with each jukebox, includes a song identification arrangement and storage memory for determining the number of times a particular song is played over a given period of time. At regular intervals, a central station contacts each data collector via telephone and requests the stored information which is subsequently transmitted via telephone lines to a central computer which tabulates and stores the information. The collected data is then processed to provide a distribution scale useful in determining the proper allocation of royalty fees received from jukebox licensing fees.

6 Claims, 4 Drawing Figures

JUKEBOX POLLING SYSTEM

BACKGROUND OF THE INVENTION

The present invention pertains to a data storage and transmission system and more particularly to a monitoring system for collecting data at remote locations and for transmitting this data to a central location. The present invention is particularly suited for use as a jukebox monitoring system for collecting data indicative of the listening habits of jukebox users and for transmitting this data to a central location for statistical compilation.

Under the new copyright laws (Public Law 94-553, Oct. 19, 1976) the operator of a coin-operated phonorecord player must obtain a compulsory license in order to operate publicly. The license requires the payment of a royalty fee to the Register of Copyrights which is then submitted to the Copyright Royalty Tribunal, on an annual basis, for distribution to parties having claims to the royalties. Each claimant may obtain a pro rata share of the fees to which the copyright owner proves entitlement. Since the burden of proof is on the copyright owner, the need arises to determine the number of times a specific recording is played on a coin-operated phonorecord player in relation to other recordings.

It is presently known to provide a jukebox with a selection computer or a manual counter which keeps a tally of the number of times a record is selected providing a more accurate indication of record popularity. Typically, the operator must push and hold a push buttom to illuminate an LED display which produces a visual indication of the selection computer contents. In order to provide a market research organization with the necessary data to conduct a survey for the proper distribution of royalty funds, it would be necessary to obtain a periodic record of the operating conditions of a plurality of jukeboxes. Such a survey would require an excessive number of persons to visit each jukebox periodically and to read visually the contents of the selection computer. Since the number of jukeboxes in operation is quite large, the employment of persons to obtain such data involves a considerable expense. Also, the ever changing nature of the record industry would require that data be gathered frequently in order to keep abreast of a continually changing market.

SUMMARY OF THE INVENTION

Therefore, one object of the present invention is to provide an audience rating system which is capable of substantially contemporaneously collecting and compiling information relating to the use of jukeboxes.

Another object of the present invention is to provide a system for automatically collecting and compiling data from statistically designated jukeboxes located at remote geographic locations utilizing existing communication facilities.

Still another object of the present invention is to provide a jukebox monitoring system for automatically recording the operating condition of selected jukeboxes and conveying this recorded information at periodic intervals to a central office.

Still another object of the invention is to provide a data acquisition system using existing telephone facilities to interrogate remotely located jukeboxes.

A further object of the present invention is to provide a jukebox polling system helpful in providing statistics to be used in the determination of the proper distribution of funds received from jukebox licensing fees.

Another object of the invention is to provide a data acquisition and transmission system which is inexpensive to operate and reliable.

In accordance with the principles of the present invention, a data acquisition and transmission system for monitoring a plurality of remotely located jukeboxes includes a data collector operatively associated with each jukebox for receiving a data stream indicative of the identity of a song selected. The collector converts the data stream to a binary number which is stored in a memory to provide a running tally of the number of times each song is played. A communication link, such as existing telephone lines, connects the remotely located data collector with a central station including a computer which periodically and automatically scans the memory content of each data collector. The computer is capable of storing information retrieved from the data collectors and is capable of generating a written report identifying the names of the songs played with the artist's name and the number of times each song has been played over a period of time.

BRIEF DESCRIPTION OF THE DRAWINGS

The foregoing and other objects, features and advantages of the invention will be apparent from the following more particular description of the preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Figure 1:
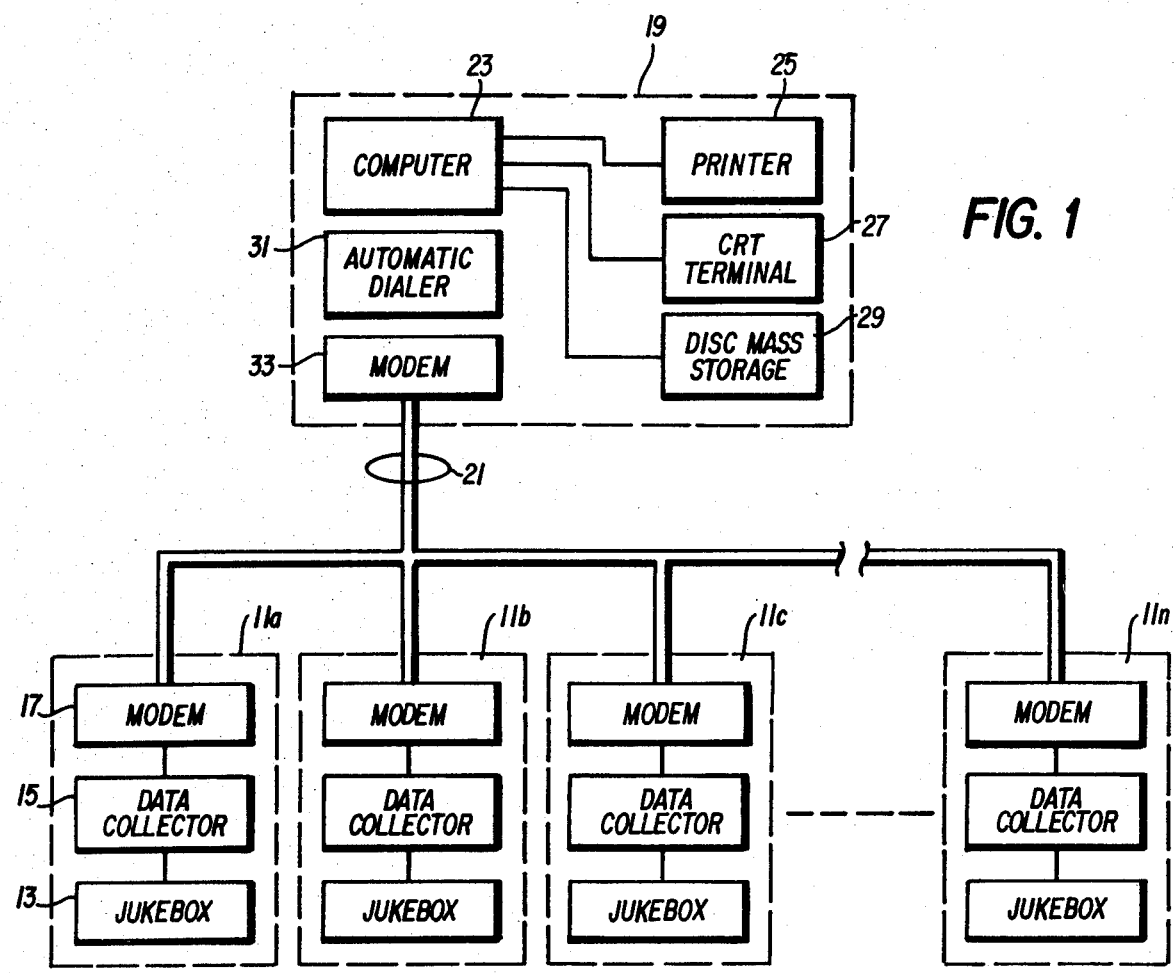
FIG. 1 is a block diagram of a preferred embodiment of an automatic jukebox polling system according to the present invention.

Referring to FIG. 1, there is illustrated a block diagram of the jukebox polling system according to the present invention. The system as illustrated in FIG. 1 includes a plurality of remote units 11a . . . 11n which are connected to a central station 19 via a single time multiplexed telephone line 21. The central station 19 contains a central processing unit 23 connected through a modem 33 to the communication network 21. The modem 33 serves to conver the digital output of the central processing unit to a form compatible with the communication network, i.e., in the case of telephone lines the information to be transmitted is converted into a series of audio tones. The central processing unit 23 may be any commercial available unit programmed to store and retrieve the telephone numbers of various remote units from external storage such as a disc mass storage unit 29, so that telephone numbers stored are presented to an automatic dialer 31 which dials a remote unit to be interrogated. The data processing unit 23 is also programmed to interrogate each remote unit 11 and receive and store information contained by the remote units 11a ... 11n. Complied data is printed out by the computer 23 on a conventional printer 25 and an CRT terminal 27 is also operatively associated with the central processing unit 23.

The typical remote unit 11 includes a data collector 15 connectable to a jukebox 13, and a modem 17 compatible with modem 33 at the central station.

Figure 2:
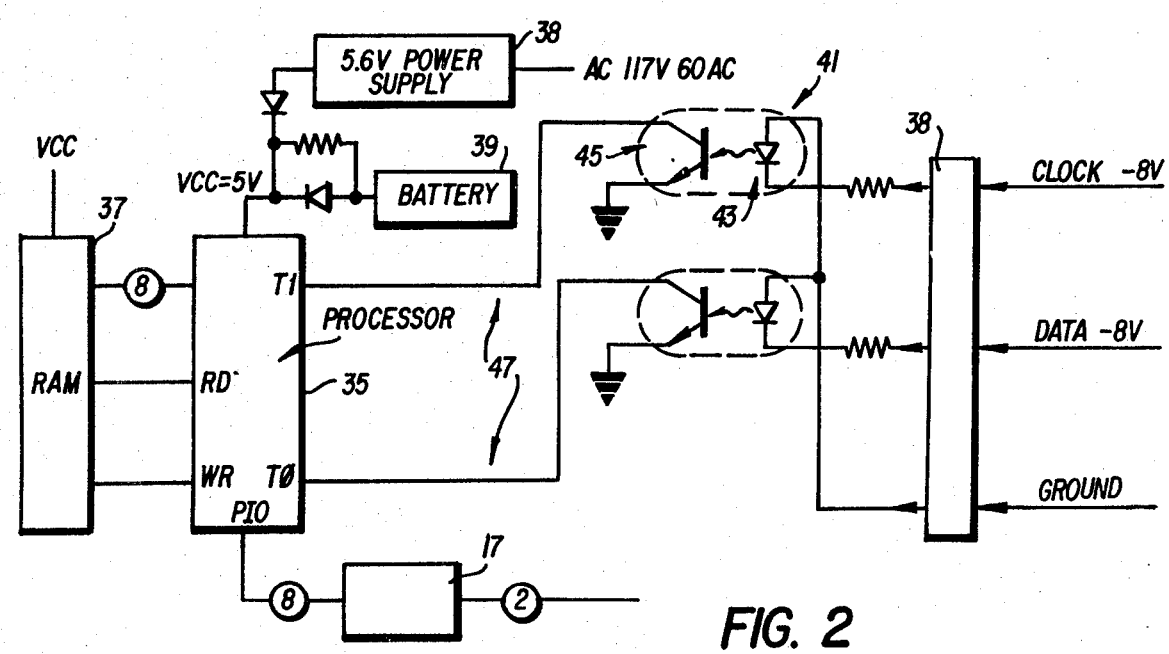
FIG. 2 illustrates the data collector and the link-up arrangement with a jukebox according to the present invention.

Each data collector 15 is connected to a common terminal strip 38 which receives the output from a selector logic module (SLM) of a jukebox 13 the operation of which is to be determined. Referring to FIG. 2, the data collector is illustrated in detail and includes a microprocessor 35 which is connected by input lines 47 to a signal conditioner and isolator 41 which receives a data stream outputed by the selector logic module from the common connector terminal 38 of the jukebox 13. The signal conditioner and isolator 41 may be a conventional optical isolator including a light-emitting diode 43 and a light sensitive photodiode 45. The signal conditioner 41 converts the data stream from the selector logic module to a signal compatible with the microprocessor 35. The information received from the selector logic module is processed by the microprocessor 35 and stored in a CMOS random access memory (RAM) 37.

The power for operating the microprocessor 35 together with all other components of the system is supplied primarily by a power supply 38 which is connected to standard 60-cycle house current lines similar to those used to power a typical jukebox. A backup trickle charge battery 39 receives a charging current from the power supply 38 providing the capability for the system to remain functional in the event of an electrical power outage.

Figure 3:
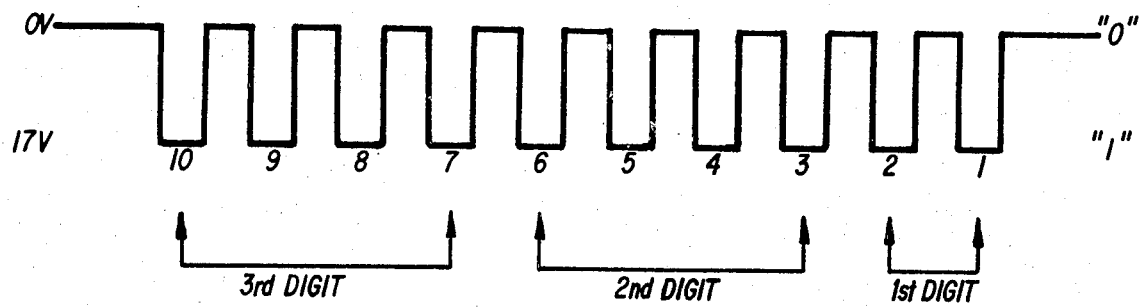
FIG. 3 illustrates a ten bit data pulse stream which identifies a particular song selected on a jukebox.

Referring now to FIG. 3, a ten bit data pulse train is illustrated typical of the output from the selector logic of a jukebox 13. The selector logic receives circuit closures from the keyboard assembly of the jukebox 13 and converts this data to binary form which is used to instruct the jukebox machinery in selecting the correct record requested. In a conventional jukebox 13, the ten bit data pulse stream is presented continuously to the terminal strip 38 and therefore may be utilized to determine the identity of a song selected.

Figure 4:
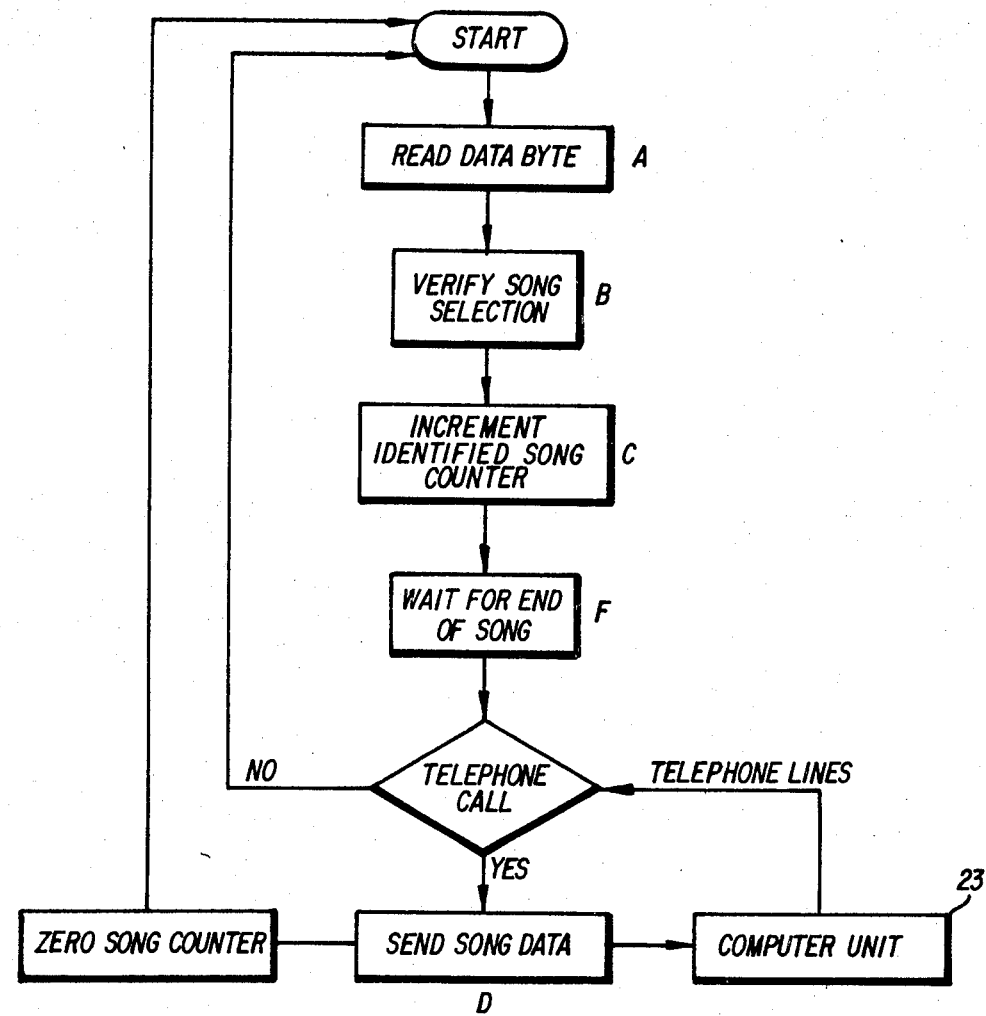
FIG. 4 is a block diagram illustrating the programmed operation of the data collector's microprocessor.

Clocking signals and the data stream from the selector logic module are fed into the data processor 35 through inputs 47. The microprocessor 35 is programmed to convert the ten bit data stream produced by the jukebox 13 to a binary number which is representative of a song selection. Referring to FIG. 4, a block diagram illustrates the operation of microprocessor. It will be appreciated that the flow chart is only exemplary of a number of different operating sequences which could be utilized to achieve the same result. It will further be appreciated that the flow charts have been simplified to illustrate the basic operating principles, but that numerous additional subroutines could be provided as will generally be understood by those skilled in the art.

In the flow chart pictured in FIG. 4, step A involves converting the ten bit data stream to a binary number representative of the identity of the song. Since the jukebox sends a continual data stream repeated approximately twenty times a second during use, the data stream is analyzed by the processor at step B and if it is determined that the data stream is continuous for ten seconds or 200 times, then the song selection is verified as being played. Upon verification of the song's selection, a memory location in the RAM 37 associated with the identity of the particular song selected is incremented a count of one in step C. The processor then waits for the end of the song at step F which is determined by an interruption of the ten bit data stream being received over input lines 47. The microprocessor then initiates the process for identifying a new selection. If an interrogation signal is received from the central processing unit 23 over the telephone lines 21 during the playing of a song, the interrogation signal is granted priority over the collection of data and the microprocessor 35 is programmed to stand ready to send information upon request as indicated in step D. After the sending of data, each memory location associated with the identity of a song in the random access memory 37 is reset to zero and the process is repeated.

The system is designed to collect data approximately twice a week and may utilize telephone lines which are rented on a watts line basis. The central station scans each one of the remote units 11a ... 11n utilizing the automatic dialer 31 which receives a telephone number from the computer 23 identifying the remote unit. The automatic dialer 31 dials the remote unit and checks to insure that the telephone line in question is not busy. If busy, the automatic dialer transmits to computer 23 the fact that the telephone line is busy. The computer then disengages the automatic dialer 31 from the line and submits another telephone number to the automatic dialer 31. If a particular remote unit 11 is contacted and fails to answer the telephone call, the computer 23 includes a timing arrangement which allows a maximum time for each remote unit to respond. If the remote unit fails to respond within the time allowed, the computer 23 is programmed to provide an output on the CRT terminal 27 as well as printer 25 to indicate an inoperative remote unit. By using printer 25, a permanent record of the inoperative unit is provided which can include such information as the location of the unit, the nature of the failure as well as the time of the breakdown. However, if the remote unit responds correctly to the telephone call from automatic dialer 31, a particular code is sent by computer 23 to activate the data collector 15 from a standby state to a ready state for sending data. A checksum, created by the data collector is sent with the data to the central station. The computer 23 performs the same checksum calculation and compares the answer with the checksum received from the data collector in order to detect transmission errors. If a transmission error is detected by the polling computer 23, it waits for a retransmission of the same data. After three times, the polling computer 23 will disrupt the transmission link and send a message to the printer 25 and CRT 27 indicating a transmission failure. In this manner, the central station 19 scans each one of the remote units 11a ... 11n in order to obtain data indicative of the operation of a number of jukeboxes.

While the invention has been particularly shown and described with reference to preferred embodiments thereof, it will be understood by those skilled in the art that various changes in form and detail may be made therein without departing from the spirit and scope of the invention as defined by the appended claims.

The embodiments of the invention in which an exclusive property or privilege are claimed are defined as follows:

I claim:

1. A data acquisition and transmission system for monitoring a plurality of remotely located check-controlled song reproduction devices each device including means for identifying a song position, said system comprising:

a song collector and transmitter unit physically connected to a song reproduction device so as to receive signals identifying a record position selected;

said unit being capable of interpreting signals received from said song reproduction device so as to count all occurrences of all record positions selected;

said unit including means to memorize the identification signal for each record position;

said means capable of storing the number of times each record position is selected over a period of times;

said unit including a transmitting means capable of transmitting stored information to a collector/scanner.

2. A data acquisition and transmission system as recited in claim 1 wherein said collector/scanner include:

an automatic polling means for contacting each of said units being physically connected to a remotely located check-controlled song reproduction device;

a memory means for storing information retrieved from each of said units; and a means for compiling the stored information received so as to produce a record identifying the names of each song and the number of times each song has been played during a specific period of time.

3. The system as recited in claim 1 wherein said unit includes a backup power supply capable of operating said unit.

4. Said system as recited in claim 2 wherein said collector/scanner communicates with each of said units utilizing a single multiplex telephone line.

5. The system as recited in claim 2 and 4 wherein said collector/scanner includes an automatic dialer for automatically polling each of said units.

6. A data acquisition and transmission system for monitoring a plurality of remotely located check-controlled song reproduction devices, said system comprising:

(1) a data collector operatively associated with each of said song reproduction devices for receiving a data stream indicative of the identity of a song selected, said collector including:

(a) a data stream conversion means for converting said data stream to a binary number representative of a song selected;

(b) a storage means for storing each binary number produced by said conversion means to provide a tally of the number of times each song has been selected;

(2) a communications link;

(3) a transmitting unit capable of connecting each data collector to said communications link;

(4) message generating means for presenting data extracted from said memory to said transmitting unit;

(5) a central station;

(6) a receiving unit for connecting said central station to said communications link for transferring signals from said link to said central station; and (7) a controller for establishing a connection between said receiving units and any of said transmitting units over said communications link.

* * * * *

UNITED STATES PATENT AND TRADEMARK OFFICE
CERTIFICATE OF CORRECTION

PATENT NO. : 4,232,295

DATED : November 4, 1980

INVENTOR(S) : George B. McConnell

It is certified that error appears in the above–identified patent and that said Letters Patent are hereby corrected as shown below:

On the cover sheet, line [73] change the name of the

Assignee to: Datta Information Systems Corporation

Signed and Sealed this

Thirty-first Day of March 1981

[SEAL]

Attest:

RENE D. TEGTMEYER

Attesting Officer   Acting Commissioner of Patents and Trademarks